United States Patent
Koo et al.

(10) Patent No.: US 11,390,287 B2
(45) Date of Patent: Jul. 19, 2022

(54) DEVICE FOR CLASSIFYING ROAD SURFACE AND SYSTEM FOR CONTROLLING TERRAIN MODE OF VEHICLE USING THE SAME

(71) Applicants: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

(72) Inventors: Jung Mo Koo, Gwangmyeong-si (KR); Sang Pil Hwang, Suwon-si (KR); Hyung Il Koo, Suwon-si (KR); Yong Gyun Kim, Gwangmyeong-si (KR); Beom Geum Cho, Suwon-si (KR); So Yeon Kim, Suwon-si (KR); Min Sang Kim, Seoul (KR)

(73) Assignees: HYUNDAI MOTOR COMPANY, Seoul (KR); KIA MOTORS CORPORATION, Seoul (KR); AJOU UNIVERSITY INDUSTRY-ACADEMIC COOPERATION FOUNDATION, Suwon-si (KR)

( * ) Notice: Subject to any disclaimer, the term of this patent is extended or adjusted under 35 U.S.C. 154(b) by 108 days.

(21) Appl. No.: 16/933,169

(22) Filed: Jul. 20, 2020

(65) Prior Publication Data
US 2021/0261134 A1   Aug. 26, 2021

(30) Foreign Application Priority Data
Feb. 21, 2020   (KR) .................. 10-2020-0021780

(51) Int. Cl.
*B60W 40/06* (2012.01)
*B60W 40/10* (2012.01)
(Continued)

(52) U.S. Cl.
CPC ............ *B60W 40/06* (2013.01); *B60W 30/02* (2013.01); *B60W 40/10* (2013.01);
(Continued)

(58) Field of Classification Search
CPC ......... B60W 2552/05; B60W 2552/35; B60W 40/06; B60W 40/10; B60W 40/105;
(Continued)

(56) References Cited

U.S. PATENT DOCUMENTS

| | | | |
|---|---|---|---|
| 5,586,028 A * | 12/1996 | Sekine ................... | B60T 8/174 701/1 |
| 8,634,960 B2 * | 1/2014 | Sandin ................... | B60L 50/62 700/258 |

(Continued)

FOREIGN PATENT DOCUMENTS

| | | | |
|---|---|---|---|
| CN | 113291291 A * | 8/2021 | ............ B60W 30/02 |
| DE | 102015106400 A1 * | 10/2016 | |

(Continued)

*Primary Examiner* — Atul Trivedi
(74) *Attorney, Agent, or Firm* — Morgan, Lewis & Bockius LLP (57) ABSTRACT

A device for identifying a road surface includes: storage for storing a deep learning-based road surface model; and a controller configured to identify a type of a road surface on which a vehicle is currently traveling, using the road surface model. The device for identifying a road surface can identify a type of a road surface on which the vehicle is traveling based on deep learning and control the terrain mode of the vehicle based on the identified type of the road surface. The type of the road surface on which the vehicle is traveling may be identified with a high accuracy and an optimal (Continued)

terrain mode may be set, thereby improving not only travel stability but also riding comfort of the vehicle.

20 Claims, 8 Drawing Sheets

(51) Int. Cl.
  *B60W 30/02* (2012.01)
  *B60W 50/02* (2012.01)
(52) U.S. Cl.
  CPC ..... *B60W 50/0205* (2013.01); *B60W 2520/26* (2013.01); *B60W 2540/10* (2013.01); *B60W 2552/05* (2020.02); *B60W 2552/35* (2020.02)
(58) Field of Classification Search
  CPC ......... B60W 2520/10; B60W 2520/26; B60W 30/02; B60W 2540/10; B60W 50/0205; B60W 2050/0019; G06N 3/08
  USPC .......................................................... 701/70
  See application file for complete search history.

(56) References Cited

U.S. PATENT DOCUMENTS

| 9,586,595 | B2 | 3/2017 | Fairgrieve et al. |
| 9,873,436 | B2 | 1/2018 | Anker et al. |
| RE46,828 | E | 5/2018 | Spillane |
| 10,414,404 | B2 | 9/2019 | Anker et al. |
| 2014/0350789 | A1 | 11/2014 | Anker et al. |
| 2015/0203124 | A1 | 7/2015 | Fairgrieve et al. |
| 2015/0232097 | A1* | 8/2015 | Luther ................ B61L 27/16 701/1 |
| 2016/0023658 | A1* | 1/2016 | Kelly ................ B60W 50/085 701/94 |
| 2018/0068495 | A1* | 3/2018 | Chainer ................ B60W 40/06 |
| 2018/0141560 | A1 | 5/2018 | Anker et al. |
| 2018/0194286 | A1* | 7/2018 | Stein ...................... B60W 10/22 |
| 2018/0210074 | A1* | 7/2018 | Hoare ................... G01S 15/931 |
| 2019/0047573 | A1* | 2/2019 | Herrera ............... B60W 40/107 |
| 2019/0187722 | A1* | 6/2019 | Hu ........................ G05D 1/0088 |
| 2019/0303759 | A1* | 10/2019 | Farabet .................. G06F 9/455 |
| 2019/0325595 | A1* | 10/2019 | Stein ........................ G06T 7/248 |
| 2019/0344783 | A1* | 11/2019 | Bertollini .......... B60W 60/0013 |
| 2020/0255019 | A1* | 8/2020 | Sekizawa ................ H04W 4/40 |
| 2020/0262468 | A1* | 8/2020 | George .............. B60W 40/068 |
| 2021/0089039 | A1* | 3/2021 | Schultz .............. B60W 60/0011 |
| 2021/0276555 | A1* | 9/2021 | Ren ........................ B60W 10/06 |
| 2021/0293575 | A1* | 9/2021 | Arcos ................... G07C 5/0841 |

FOREIGN PATENT DOCUMENTS

| DE | 102015106401 A1 * | 10/2016 | ............. B60T 8/172 |
| DE | 102015106402 A1 * | 10/2016 | |
| DE | 102015106403 A1 * | 10/2016 | |
| DE | 102015106408 A1 * | 10/2016 | ............. B60T 8/172 |
| DE | 102017201302 A1 * | 4/2018 | ............ B60W 10/04 |
| DE | 102020121406 A1 * | 8/2021 | ............ B60W 30/02 |
| EP | 2 729 340 | 5/2014 | |
| GB | 2552024 A * | 1/2018 | ......... B60K 31/0008 |
| GB | 2571589 A * | 9/2019 | ............ B60W 10/04 |
| JP | 6777103 B2 * | 10/2020 | ............ B60C 11/246 |
| KR | 10-1839107 B1 | 3/2018 | |

\* cited by examiner

DEVICE FOR CLASSIFYING ROAD SURFACE AND SYSTEM FOR CONTROLLING TERRAIN MODE OF VEHICLE USING THE SAME

CROSS-REFERENCE TO RELATED APPLICATION

This application claims the benefit of priority to Korean Patent Application No. 10-2020-0021780, filed in the Korean Intellectual Property Office on Feb. 21, 2020, the entire contents of which are incorporated herein by reference.

TECHNICAL FIELD

The present disclosure relates to a system that identifies a type (e.g., a normal, a sand, a mud, and a snow) of a road surface on which a vehicle is traveling based on deep learning, and controls a terrain mode of the vehicle based on the identified type of the road surface.

BACKGROUND

Generally, deep learning (or a deep neural network) is a type of machine learning, and is composed of several layers of Artificial Neural Networks (ANNs) between an input and an output. Such artificial neural network may include a convolution neural network (CNN), a recurrent neural network (RNN), and the like based on a structure, a problem to be solved, a purpose, and the like.

The deep learning is used to solve various problems such as classification, regression, localization, detection, segmentation, and the like.

A conventional system for controlling a terrain mode of a vehicle includes: a sub-system controller for starting control of a vehicle sub-system in one sub-system control mode selected from a plurality of sub-system control modes corresponding to one or more different terrain types; and a determination device for determining a sub-system control mode that is most suitable for a terrain on which the vehicle is traveling based on a plurality of terrain surface signals indicating terrains during the vehicle travel.

This conventional system calculates a combined probability value in a specific scheme for determining the sub-system control mode that is most suitable for the terrain on which the vehicle is traveling based on the plurality of terrain surface signals. However, a state of the road surface may not be determined with a high accuracy using the combined probability value.

In addition, the conventional system is inaccurate because the conventional system determines the state of the road surface based on a dynamics-based model.

The contents described in the background are written to improve understanding of the background of the present disclosure, which may include contents that are not known to those skilled in the art to which this technology belongs.

SUMMARY

The present disclosure has been made to solve the above-mentioned problems occurring in the prior art while advantages achieved by the prior art are maintained intact.

An aspect of the present disclosure provides a device for classifying a road surface and a system for controlling a terrain mode of a vehicle using the same that may identify a type (e.g., a normal, a sand, a mud, and a snow) of a road surface on which the vehicle is traveling based on deep learning and control the terrain mode of the vehicle based on the identified type of the road surface, so that the type of the road surface on which the vehicle is traveling may be identified with a high accuracy and an optimal terrain mode may be set, thereby improving not only travel stability but also riding comfort of the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a device for identifying a road surface includes: storage for storing a deep learning-based road surface model; and a controller that identifies a type of a road surface on which a vehicle is currently traveling, using the road surface model.

The controller may obtain a vehicle signal through a vehicle network, convert the vehicle signal into a frequency domain signal and then calculate a ratio of energy for each frequency band of the frequency domain signal, calculate a road surface state value based on the vehicle signal, and identify a type of a road surface corresponding to the ratio of the energy for each frequency band and the road surface state value based on the road surface model.

The controller may sequentially store vehicle signals for a reference time obtained from the vehicle network in a buffer, and sequentially overwrite storage spaces having previous vehicle signals in an order of a storage space having an oldest vehicle signal and a storage space of a next oldest vehicle signal, when the buffer is completely full.

The controller may divide the frequency domain signal into a plurality of frequency bands having different sizes.

The controller may set a size of a low frequency band to be larger than a size of a high frequency band.

The controller may calculate, as the road surface state value, at least one of a braking smoothness, a handling smoothness, a degree of acceleration compared to user's willingness to accelerate, a roughness of the road surface, a setting value based on whether an ESC is involved, a sum of a slip amount of a FL wheel, a sum of a slip amount of a FR wheel, a sum of a slip amount of a RL wheel, or a sum of a slip amount of a RR wheel.

The controller may remove a road surface maintained within a reference time from road surfaces identified based on the road surface model.

In one embodiment, the type of the road surface may include at least one of a normal, a sand, a mud, or a snow.

According to another aspect of the present disclosure, a system for controlling a terrain mode of a vehicle includes: a road surface classification device that identifies a type of a road surface on which the vehicle is currently traveling, using a deep learning-based road surface model; and a control device that sets the terrain mode of the vehicle based on the type of the road surface identified by the road surface classification device.

The control device may maintain a current terrain mode even when the type of the road surface is changed when a speed of the vehicle exceeds a first reference speed.

The control device may maintain a current terrain mode even when the type of the road surface is changed when a speed of the vehicle is equal to or less than a second reference speed.

The control device may maintain a current terrain mode when an abnormality occurs in the road surface classification device.

The control device may maintain a current terrain mode of the vehicle when at least one of a situation where travel is unusual, a situation where an environment is unusual, a situation where the road surface is unusual, or a situation where the vehicle is unusual occurs.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of the related known configuration or function will be omitted when it is determined that it interferes with the understanding of the embodiment of the present disclosure.

In describing the components of the embodiment according to the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
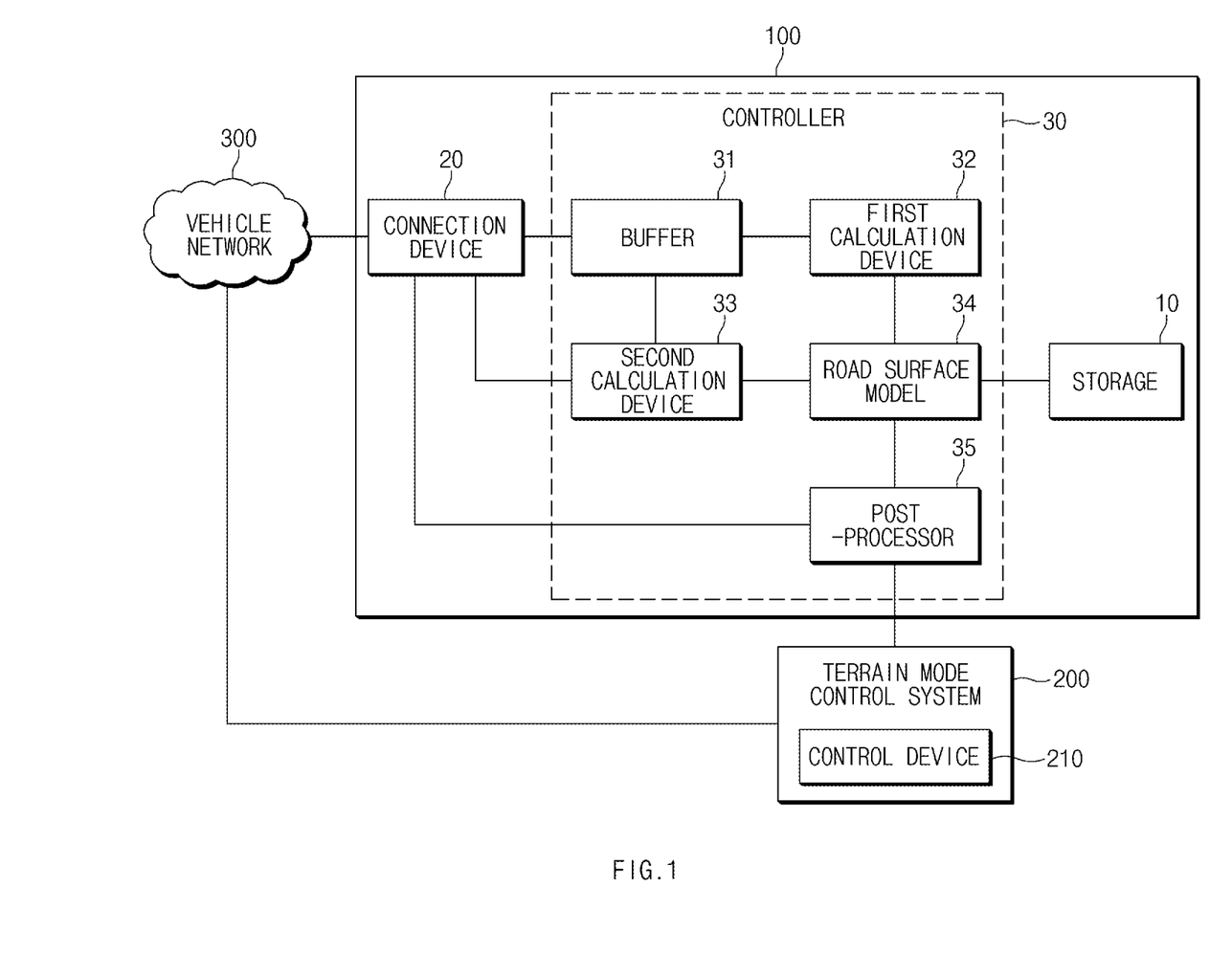
FIG. 1 is a configuration diagram of a road surface classification device according to an exemplary embodiment of the present disclosure.

FIG. 1 is a configuration diagram of a road surface classification device according to an exemplary embodiment of the present disclosure.

As shown in FIG. 1, a road surface classification device 100 according to an exemplary embodiment of the present disclosure may include a storage 10, a connection device 20, and a controller 30. In this connection, the components may be combined with each other and implemented as one component, or some components may be omitted based on a scheme of implementing the road surface classification device 100 according to an exemplary embodiment of the present disclosure.

In a description of each of the components, firstly, the storage 10 may store various logics, algorithms, and programs that are required in a process of identifying a type (e.g., a normal, a sand, a mud, and a snow) of a road surface on which a vehicle is traveling based on deep learning.

Specifically, the storage 10 may store various logics, algorithms, and programs that are required in a process of obtaining a vehicle signal through a vehicle network 300, converting the vehicle signal into a frequency domain signal and then calculating a ratio of energy for each frequency band of the frequency domain signal, calculating a road surface state value based on the vehicle signal, and identifying a type of a road surface corresponding to the ratio of the energy for each frequency band and the road surface state value based on a road surface model 34 trained based on an artificial neural network.

The storage 10 may store a road surface model composed of an artificial neural network in which the deep learning is completed. In this connection, the artificial neural network may be implemented as, for example, a MLP (Multi-Layer Perceptron), and may receive the ratio of the energy for each frequency band of the vehicle signal and the road surface state value for each type of road surface as training data to perform the deep learning. In addition, the road surface model has weight and bias values.

The storage 10 may include at least one type of a storage medium of at least one type of memory such as a flash memory type, a hard disk type, a micro type, and a card type (e.g., an SD card (Secure Digital Card) or an XD card (eXtream Digital Card)), and the like, and a RAM (Random Access Memory), a SRAM (Static RAM), a ROM (Read Only Memory), a PROM (Programmable ROM), an EEPROM (Electrically Erasable PROM), a MRAM (Magnetic RAM), a magnetic disk, and an optical disk type memory.

The connection device 20 is a module that provides an interface to be connected to the vehicle network. The controller 30 may be connected to the vehicle network through the connection device 20 to obtain various information (signals). In this connection, the vehicle network includes a CAN (Controller Area Network), a LIN (Local Interconnect Network), a FlexRay, a MOST (Media Oriented Systems Transport), an Ethernet, and the like.

The controller 30 performs overall control such that each component may perform a function thereof normally. Such controller 30 may be implemented in a form of hardware or in a form of software, or in a form of a combination of the hardware and the software. The controller 30 may be implemented as a microprocessor, but is not limited thereto.

The controller 30 may identify the type (e.g., the normal, the sand, the mud, and the snow) of the road surface on which the vehicle is traveling based on the deep learning.

In particular, the controller 30 may perform various controls in the process of obtaining the vehicle signal through the vehicle network 300, converting the vehicle signal into the frequency domain signal and then calculating the ratio of the energy for each frequency band of the frequency domain signal, calculating the road surface state value based on the vehicle signal, and identifying the type of the road surface corresponding to the ratio of the energy for each frequency band and the road surface state value based on the road surface model 34 trained based on the artificial neural network.

In this connection, the type of the road surface may include, for example, the normal, the sand, the mud, and the snow. The controller 30 may perform various controls in a process of classifying the road surface corresponding to the ratio of the energy for each frequency band and the road surface state value into at least one of the normal, the sand, the mud, or the snow using the road surface model trained based on the artificial neural network. In this connection, the controller 30 may classify a road surface that is not classified as one of the sand, the mud, and the snow as the normal.

In addition, the controller 30 may obtain the vehicle signal as shown in [Table 1] below through the vehicle network 300.

TABLE 1

|  | Information | Signal name | Message name |
|---|---|---|---|
| Driver manipulation | Accelerator pedal position | PV_AV_CAN | EMS12 |
|  | Brake pedal position | CYL_PRES | ESP12 |
|  | Steering angle | SAS_Angle | SAS11_FS |
|  | Steering wheel speed | SAS_Speed | SAS11_FS |
|  | Steering wheel torque | CR_Mdps_StrColTq | MDPS12_FS |
|  | Longitudinal acceleration | LONG_ACCEL | ESP12 |
| Vehicle behavior | Lateral acceleration | LAT_ACCEL | ESP12 |
|  | Yaw rate | YAW_RATE | ESP12 |
|  | Wheel speed (FL) | WHL_SPD_FL | WHL_SPD11 |
|  | Wheel speed (FR) | WHL_SPD_FR | WHL_SPD11 |
|  | Wheel speed (RL) | WHL_SPD_RL | WHL_SPD11 |
|  | Wheel speed (RR) | WHL_SPD_RR | WHL_SPD11 |
|  | TCS Flag | TCS_CTL | TCS11 |
|  | Vehicle speed (EMS calculated) | VSP | EMS11 |
|  | Vehicle speed (TCU calculated) | VS_TCU | TCU12 |
|  | Engine RPM | N | EMS11 |
|  | Engine required torque | TQI | EMS11 |
|  | Engine output torque | TQI_ACOR | EMS11 |
|  | Current gear stage | CUR_GR | TCU12 |
|  | Target gear stage | CF_Tcu_TarGr | TCU13 |
|  | 4WD torque | 4WD_TQC_CUR | 4WD11 |

In this connection, the 'TCS (Traction Control System) Flag', the current gear stage, the target gear stage, and the 4WD torque represent control values, and other values are values measured by various sensors.

In addition, the controller 30 may calculate the road surface state value as shown in [Table 2] below using the vehicle signal of [Table 1]. In this connection, the road surface state values are values defined to determine a state of the road surface.

TABLE 2

| Road surface state value | Calculation formula |
|---|---|
| Braking smoothness | $\sum \dfrac{VSP \times LONG\_ACC}{CYL\_PRES}$ |
| Handling smoothness | $\sum \dfrac{YAW\_RATE}{SAS\_SPEED}$ |
| Degree of acceleration compared to user's willingness to accelerate | $\sum \dfrac{LONG\_ACC}{RPM}$ |
| Roughness of road surface | #LONG_ACC_PEAK + #LAT_ACC_PEAK |
| Whether ESC is involved | $\sum \dfrac{RPM}{APS}$ |
| Sum of slip amount of FL wheel | $\Sigma(VSP - WHL\_SPD\_FL)$ |
| Sum of slip amount of FR wheel | $\Sigma(VSP - WHL\_SPD\_FR)$ |
| Sum of slip amount of RL wheel | $\Sigma(VSP - WHL\_SPD\_RL)$ |
| Sum of slip amount of RR wheel | $\Sigma(VSP - WHL\_SPD\_RR)$ |

In this connection, the VSP means the EMS (Engine Management System) calculated vehicle speed, the LONG_ACC means the longitudinal acceleration, the CYL_PRES means the brake pedal position (a brake cylinder pressure), the YAW_RATE means the yaw rate, the SAS_SPEED means the steering wheel speed, the RPM (Revolution Per Minute) means the number of revolutions of the engine, the LONG_ACC_PEAK means a maximum value of the Longitudinal acceleration signal, the LAT_ACC_PEAK means a maximum value of the lateral acceleration signal, the APS (Accel Position Sensor) means the accelerator pedal position, the WHL_SPD_FL means the speed of the front left wheel, the WHL_SPD_FR means the speed of the front right wheel, the WHL_SPD_RL means the speed of the rear left wheel, and the WHL_SPD_RR means the speed of the rear right wheel.

In addition, the braking smoothness is a value indicating how smooth braking of the vehicle is, the handling smoothness is a value indicating how smooth handling of the vehicle is, and a setting value based on whether the ESC (Electronic Stability Control) is involved has 1 when the ESC is involved or 0 when the ESC is not involved.

Such the controller 30 may include a buffer 31, a first calculation device 32, a second calculation device 33, the road surface model 34, and a post-processor 35 as internal components. Hereinafter, the internal components will be described with reference to FIGS. 2 to 4.

Figure 2:
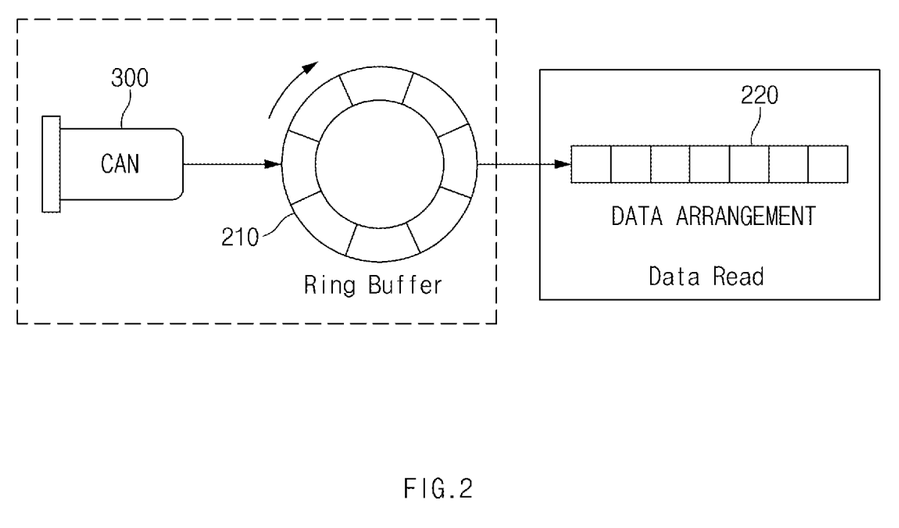
FIG. 2 is an exemplary view illustrating a structure of a buffer disposed in a road surface classification device according to an exemplary embodiment of the present disclosure.

FIG. 2 is an exemplary view illustrating a structure of a buffer disposed in a road surface classification device according to an exemplary embodiment of the present disclosure.

As shown in FIG. 2, the buffer 31 disposed in the road surface classification device according to an exemplary embodiment of the present disclosure may be implemented as a ring buffer that sequentially stores vehicle signals (e.g., the vehicle signals of [Table 1]) obtained from the vehicle network through the connection device 20 in units of a predetermined time (e.g., 1 second), and sequentially overwrite new vehicle signals with storage spaces having previous vehicle signals in an order of a storage space having an oldest vehicle signal and a storage space of a next oldest vehicle signal, when the buffer is completely full. In this connection, a size of the ring buffer may be, for example, 128 bits.

The buffer 31 may store the vehicle signals in an entire storage space (e.g., a data storage space for 8 seconds) in a scheme of storing a vehicle signal for 1 second obtained from the vehicle network through the connection device 20, and then storing data for 1 second, which is obtained thereafter. In this connection, data for 1 second stored in a first space of the buffer 31 may be arranged as '220'.

Figure 3:
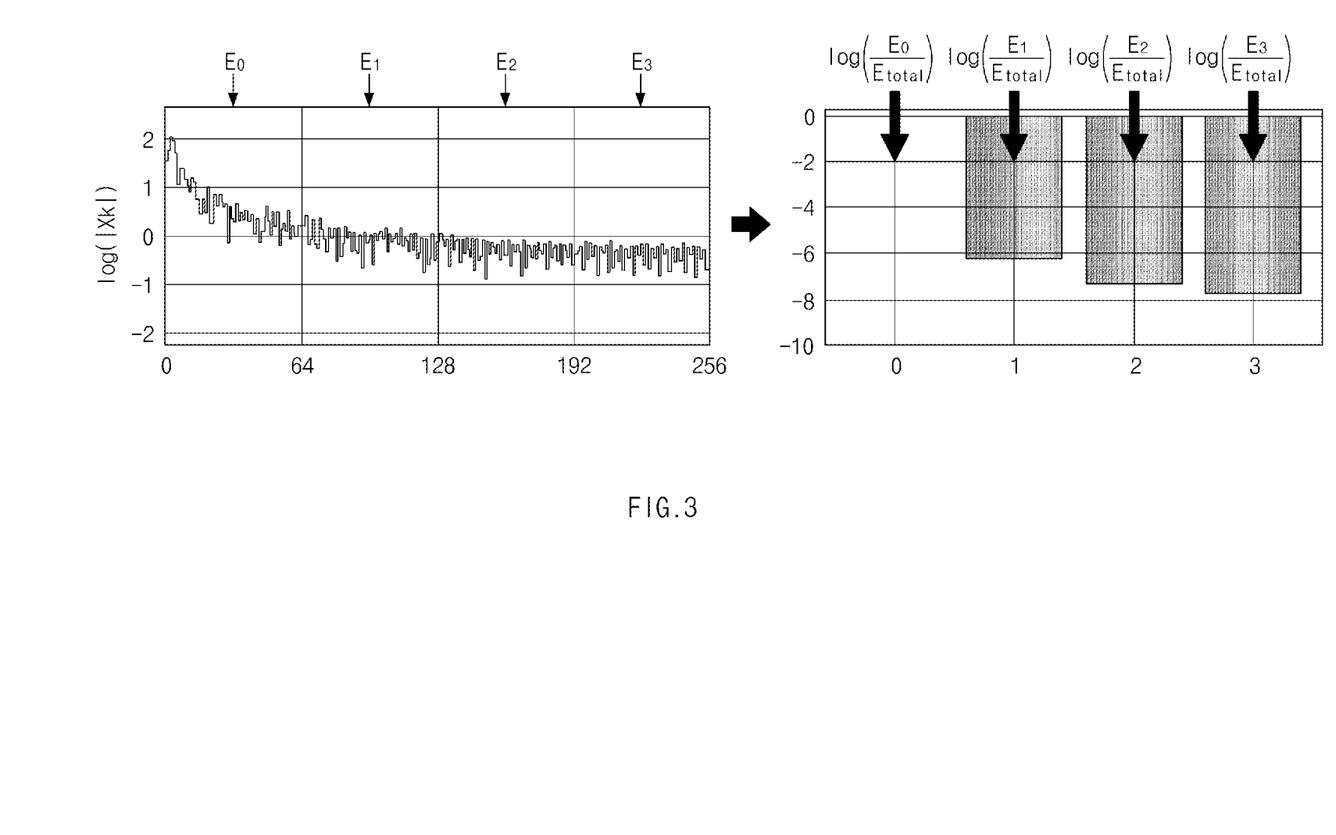
FIG. 3 is an exemplary view illustrating an operation of a first calculation device disposed in a road surface classification device according to an exemplary embodiment of the present disclosure.

FIG. 3 is an exemplary view illustrating an operation of a first calculation device disposed in a road surface classification device according to an exemplary embodiment of the present disclosure.

As shown in FIG. 3, the first calculation device 32 disposed in the road surface classification device according to an exemplary embodiment of the present disclosure firstly converts the vehicle signal of a time domain stored in the buffer 31 into a vehicle signal of a frequency domain through a Fourier transform logic. In this connection, the first calculation device 32 may perform a Fourier transform on the 21 vehicle signals shown in [Table 1].

Thereafter, the first calculation device 32 divides the vehicle signal of the frequency domain into a plurality of frequency bands. As an example, the first calculation device 32 may divide the vehicle signal in the frequency domain into four frequency bands. In this connection, sizes of the four frequency bands may or may not be the same. As a result of an experiment, the larger the size of a low frequency band was, the more accurately the type of the road surface could be identified. In this connection, the low frequency band may mean a frequency band equal to or below a middle of an entire frequency band of the vehicle signal.

Thereafter, the first calculation device 32 calculates energy for each frequency band. For reference, a logic itself for calculating the energy is a well-known technique. Thus, any logic may be used because the logic is not the gist of the present disclosure.

Thereafter, the first calculation device 32 calculates a ratio of the energy for each frequency band. That is, the first calculation device 32 calculates a ratio of the energy of each frequency band to energy of the entire frequency band.

The second calculation device 33 may calculate the road surface state values as shown in [Table 2] using the vehicle signals of [Table 1] obtained from the vehicle network 300 through the connection device 20.

The road surface model 34 is a model in which the deep learning is completed by receiving the ratio of the energy for each frequency band of the vehicle signal and the road surface state value for each type of road surface, which may be, for example, implemented as a multi-layer perceptron (MLP) network.

Such road surface model 34 identifies the type of the road surface corresponding to the ratio of the energy for each frequency band of the vehicle signal calculated by the first calculation device 32 and the road surface state value calculated by the second calculation device 33. That is, the road surface model 34 may classify the road surface corresponding to the ratio of the energy for each frequency band and the road surface state value as one of the normal, the sand, the mud, and the snow using the road surface model trained based on the artificial neural network.

The road surface model 34 may receive 4 ratios of the energy for 4 frequency bands for each of the 21 vehicle signals shown in the [Table 1] (total 84), and receive the 9 road surface state values shown in [Table 2]. That is, the road surface model 34 may identify the type of the road surface based on the 93 data.

Figure 4:
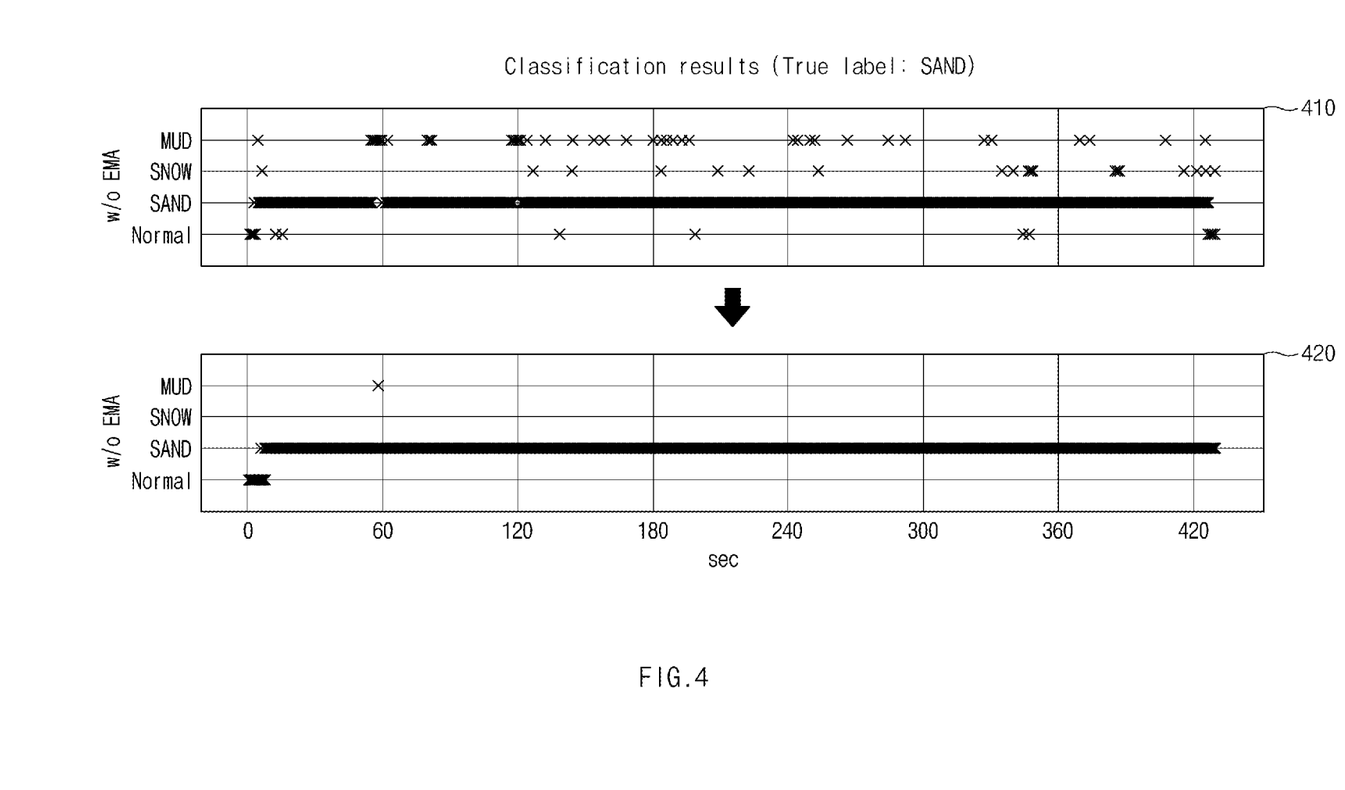
FIG. 4 is an exemplary view illustrating an operation of a post-processor disposed in a road surface classification device according to an exemplary embodiment of the present disclosure.

FIG. 4 is an exemplary view illustrating an operation of a post-processor disposed in a road surface classification device according to an exemplary embodiment of the present disclosure.

As shown in '410' of FIG. 4, the road surface classified by the road surface model 34 changes instantaneously. This is a classification error, which may be compensated by the post-processor 35.

The post-processor 35 may remove an instantaneously classified road surface by applying an EMA (Exponential Moving Average) to road surface data classified by the road surface model 34. That is, the post-processor 35 may remove a road surface maintained within a reference time (e.g., 1 second). A result of the removal is '420'.

In one example, a terrain mode control system 200 of the vehicle using the road surface classification device 100 according to an exemplary embodiment of the present disclosure may include a control device 210 that sets a terrain mode of the vehicle based on the type of the road surface classified by the road surface classification device 100.

The control device 210 of the terrain mode control system 200 of the vehicle may limit a change in the terrain mode at a high speed to prevent a risk that may occur because of the change in the terrain mode at the high speed. For example, the terrain mode control system 200 of the vehicle maintains a current terrain mode even when the type of the road surface is changed by the road surface classification device 100 when the vehicle speed exceeds 55 kph.

The control device 210 of the terrain mode control system 200 of the vehicle may limit the change in the terrain mode at a low speed, taking into account a phenomenon that an accuracy of the road surface classification device 100 is low at the low speed. For example, the terrain mode control system 200 of the vehicle maintains the current terrain mode even when the type of the road surface is changed by the road surface classification device 100 when the vehicle speed is equal to or less than 5 kph.

The control device 210 of the terrain mode control system 200 of the vehicle may set the terrain mode of the vehicle as normal when communication with the road surface classification device 100 is disconnected or an error occurs in the controller 30 of the road surface classification device 100.

The control device 210 of the terrain mode control system 200 of the vehicle may set the terrain mode of the vehicle as the normal or maintain the current terrain mode in an unusual situation by reflecting a travel situation of the vehicle. Such unusual situation is as follows.

A situation where travel is unusual may include a switch manipulation of a driver, such as a travel mode, Electronic Stability Control (ESC) OFF, All-Wheel Drive (AWD) LOCK, and the like, and backward travel.

A situation where an environment is unusual may include strong wind (wind having a strength equal to or greater than a reference value), heavy rain (an amount of rainfall equal to or greater than a reference value), heavy snowfall (an amount of snowfall equal to or greater than a reference value), low temperature (a temperature equal to or below a reference value), and high temperature (a temperature equal to or above the reference value). Such strong wind information, heavy rain information, heavy snow information, low temperature information, and high temperature information may be obtained from a navigation device through the vehicle network 300.

A situation where the road surface is unusual may include a case in which friction coefficients of left/right wheels of the vehicle are different, a case in which friction coefficients of front/rear wheels of the vehicle are different, a case in which one or more wheels are not in contact with the road surface, a case in which the road surface is frequently changed, and a case of traveling on an inclined road.

A situation where the vehicle is unusual may include a case in which a state (a pressure, wear, and the like) of a tire is abnormal, a case in which a snow chain is fastened, a case in which different tires are mounted, an overloading case, an overweight case, and a case in which a trailer is mounted.

Figure 5:
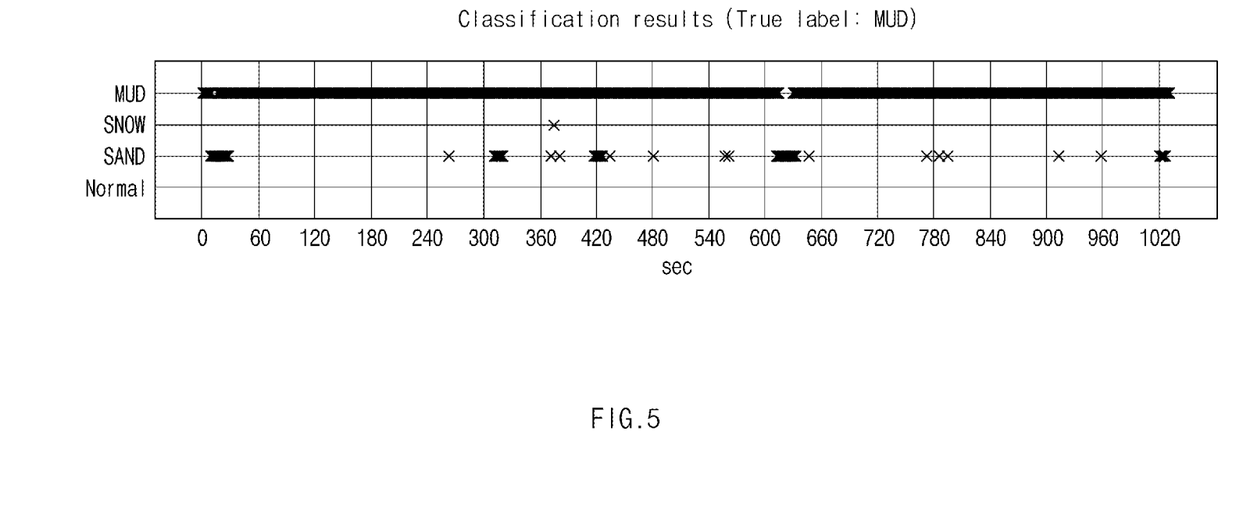
FIG. 5 is an exemplary view illustrating a performance of a road surface classification device according to an exemplary embodiment of the present disclosure.

FIG. 5 is an exemplary view illustrating a performance of a road surface classification device according to an exemplary embodiment of the present disclosure.

As shown in FIG. 5, a road surface classified by the road surface classification device 100 mounted on the vehicle when the vehicle travels on the mud road surface is indicated. It may be seen that, although there are some errors, a current road surface is mainly classified as the mud.

Figure 6:
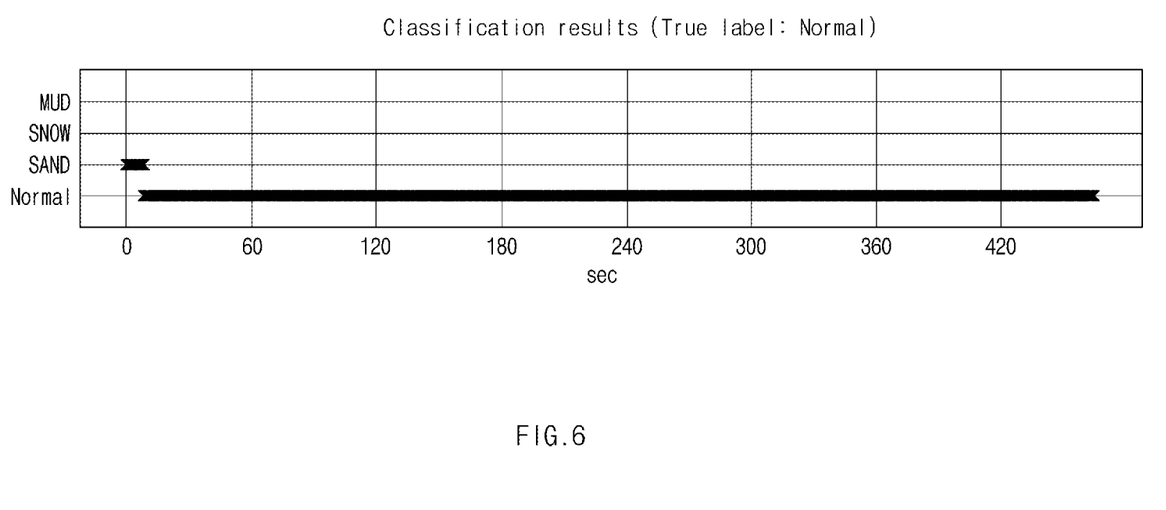
FIG. 6 is another exemplary view illustrating a performance of a road surface classification device according to an exemplary embodiment of the present disclosure.

FIG. 6 is another exemplary view illustrating a performance of a road surface classification device according to an exemplary embodiment of the present disclosure.

As shown in FIG. 6, a road surface classified by the road surface classification device 100 mounted on the vehicle when the vehicle travels on the normal road surface is indicated. It may be seen that, except for about 5 seconds at the beginning, the current road surface can be classified as the normal road surface.

Figure 7:
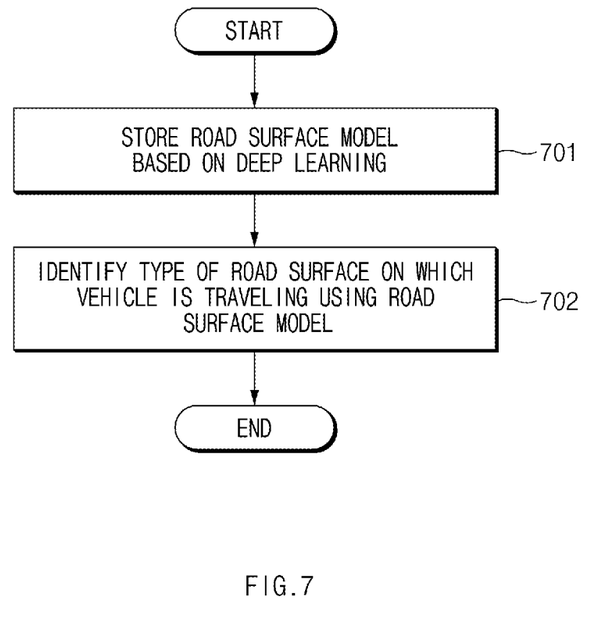
FIG. 7 is an embodiment flowchart of a road surface classification method according to an exemplary embodiment of the present disclosure.

FIG. 7 is a flowchart of a road surface classification method according to an exemplary embodiment of the present disclosure.

First, the storage 10 stores the deep leaning-based road surface model (701).

Thereafter, the controller 30 identifies the type of the road surface on which the vehicle is traveling using the road surface model (702).

Figure 8:
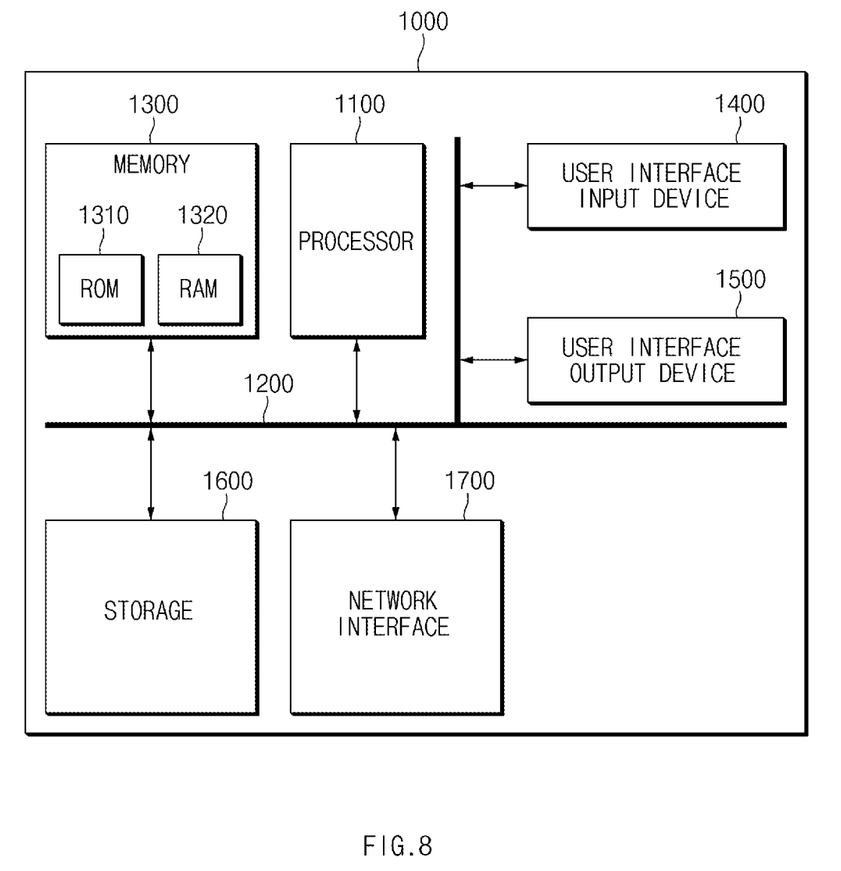
FIG. 8 illustrates a computing system for implementing a road surface classification method according to an exemplary embodiment of the present disclosure.

FIG. 8 illustrates a computing system for implementing a road surface classification method according to an exemplary embodiment of the present disclosure.

With reference to FIG. 8, the road surface classification method according to an exemplary embodiment of the present disclosure described above may also be implemented via the computing system. A computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a SSD (Solid State Drive), a removable disk, a CD-ROM. The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

Therefore, the embodiments disclosed in the present disclosure are not intended to limit the technical idea of the present disclosure but to illustrate the present disclosure, and the scope of the technical idea of the present disclosure is not limited by the embodiments. The scope of the present disclosure should be construed as being covered by the scope of the appended claims, and all technical ideas falling within the scope of the claims should be construed as being included in the scope of the present disclosure.

The device for classifying the road surface and the system for controlling the terrain mode of the vehicle using the same according to an embodiment of the present disclosure may identify the type (e.g., the normal, the sand, the mud, and the snow) of the road surface on which the vehicle is traveling based on the deep learning and control the terrain mode of the vehicle based on the identified type of the road surface, so that the type of the road surface on which the vehicle is traveling may be identified with the high accuracy and an optimal terrain mode may be set, thereby improving not only travel stability but also riding comfort of the vehicle.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. A device for identifying a road surface, the device comprising:
a storage for storing a road surface model in which deep learning is completed by a ratio of energy for each frequency band of a vehicle signal, and a road surface state value; and
a controller configured to identify a type of a road surface on which a vehicle is currently traveling, using the road surface model.

2. The device of claim 1, wherein the controller is configured to:
obtain a vehicle signal through a vehicle network,
convert the vehicle signal into a frequency domain signal and then calculate a ratio of energy for each frequency band of the frequency domain signal,
calculate a road surface state value based on the vehicle signal, and
identify a type of a road surface corresponding to the ratio of the energy for each frequency band and the road surface state value based on the road surface model.

3. The device of claim 2, wherein the controller is configured to:
sequentially store vehicle signals for a reference time obtained from the vehicle network in a buffer, and
sequentially overwrite storage spaces having previous vehicle signals in an order of a storage space having an oldest vehicle signal and a storage space of a next oldest vehicle signal, when the buffer is completely full.

4. The device of claim 2, wherein the controller is configured to divide the frequency domain signal into a plurality of frequency bands having different sizes.

5. The device of claim 4, wherein the controller is configured to set a size of a low frequency band to be larger than a size of a high frequency band.

6. The device of claim 2, wherein the controller is configured to calculate, as the road surface state value, at least one of a braking smoothness, a handling smoothness, a degree of acceleration compared to user's willingness to accelerate, a roughness of the road surface, a setting value based on whether an Electronic Stability Control (ESC) is involved, a sum of a slip amount of a Front-Left (FL) wheel, a sum of a slip amount of a Front-Right (FR) wheel, a sum of a slip amount of a Rear-Left (RL) wheel, or a sum of a slip amount of a (Rear-Right) RR wheel.

7. The device of claim 2, wherein the controller is configured to remove a road surface maintained within a reference time from road surfaces identified based on the road surface model.

8. The device of claim 1, wherein the type of the road surface includes at least one of a normal, a sand, a mud, or a snow.

9. A system for controlling a terrain mode of a vehicle, the system comprising:
a road surface classification device configured to identify a type of a road surface on which the vehicle is currently traveling, using a road surface model; and
a control device configured to set the terrain mode of the vehicle based on the type of the road surface identified by the road surface classification device,
wherein the road surface model is a model in which deep learning is completed by a ratio of energy for each frequency band of a vehicle signal, and a road surface state value.

10. The system of claim 9, wherein the control device is configured to maintain a current terrain mode even when the type of the road surface is changed when a speed of the vehicle exceeds a first reference speed.

11. The system of claim 9, wherein the control device is configured to maintain a current terrain mode even when the type of the road surface is changed when a speed of the vehicle is equal to or less than a second reference speed.

12. The system of claim 9, wherein the control device is configured to maintain a current terrain mode when an abnormality occurs in the road surface classification device.

13. The system of claim 9, wherein the control device is configured to maintain a current terrain mode of the vehicle when at least one of a situation where travel is unusual, a situation where an environment is unusual, a situation where the road surface is unusual, or a situation where the vehicle is unusual occurs.

14. The system of claim 9, wherein the road surface classification device is configured to:
obtain a vehicle signal through a vehicle network,
convert the vehicle signal into a frequency domain signal and then calculate a ratio of energy for each frequency band of the frequency domain signal,
calculate a road surface state value based on the vehicle signal, and
identify a type of a road surface corresponding to the ratio of the energy for each frequency band and the road surface state value based on the road surface model.

15. The system of claim 14, wherein the road surface classification device is configured to:
sequentially store vehicle signals for a reference time obtained from the vehicle network in a buffer, and
sequentially overwrite storage spaces having previous vehicle signals in an order of a storage space having an oldest vehicle signal and a storage space of a next oldest vehicle signal, when the buffer is completely full.

16. The system of claim 14, wherein the road surface classification device is configured to divide the frequency domain signal into a plurality of frequency bands having different sizes.

17. The system of claim 16, wherein the road surface classification device is configured to set a size of a low frequency band to be larger than a size of a high frequency band.

18. The system of claim 14, wherein the road surface classification device is configured to calculate, as the road surface state value, at least one of a braking smoothness, a handling smoothness, a degree of acceleration compared to user's willingness to accelerate, a roughness of the road surface, a setting value based on whether an Electronic Stability Control (ESC) is involved, a sum of a slip amount of a Front-Left (FL) wheel, a sum of a slip amount of a Front-Right (FR) wheel, a sum of a slip amount of a Rear-Left (RL) wheel, or a sum of a slip amount of a Rear-Right (RR) wheel.

19. The system of claim 14, wherein the road surface classification device is configured to remove a road surface maintained within a reference time among road surfaces identified based on the road surface model.

20. The system of claim 9, wherein the type of the road surface includes at least one of a normal, a sand, a mud, or a snow.

* * * * *